United States Patent [19]

Wood, Jr.

[11] Patent Number: 5,056,957
[45] Date of Patent: Oct. 15, 1991

[54] OIL SPILL RECOVERY APPARATUS AND METHOD

[76] Inventor: Jack S. Wood, Jr., 21859 Angeli Pl., Grass Valley, Calif. 95949

[21] Appl. No.: 524,132
[22] Filed: May 16, 1990
[51] Int. Cl.⁵ .............................. E02B 15/06
[52] U.S. Cl. ...................... 405/66; 405/63; 210/923
[58] Field of Search ............ 405/60, 63, 64, 65, 405/66, 211; 210/923

[56] References Cited

U.S. PATENT DOCUMENTS 3,708,983  1/1973  Brown ................................. 405/64
3,756,294  9/1973  Rainey ............................ 405/65 X
4,249,834  2/1981  Bouvier ............................ 405/70
4,282,822  8/1981  Jackson ........................ 405/66 X

FOREIGN PATENT DOCUMENTS 01580  8/1980  PCT Int'l Appl. ............ 405/66

Primary Examiner—David H. Corbin
Attorney, Agent, or Firm—Hughes & Multer

[57] ABSTRACT

A containment skirt having a stowed position about an upper perimeter portion of an oil tanker. When an oil spill occurs, the skirt is moved its stowed position to a deployed position where it extends downwardly into the water so as to surround the oil tanker and contain the oil flowing from the tanker.

13 Claims, 2 Drawing Sheets

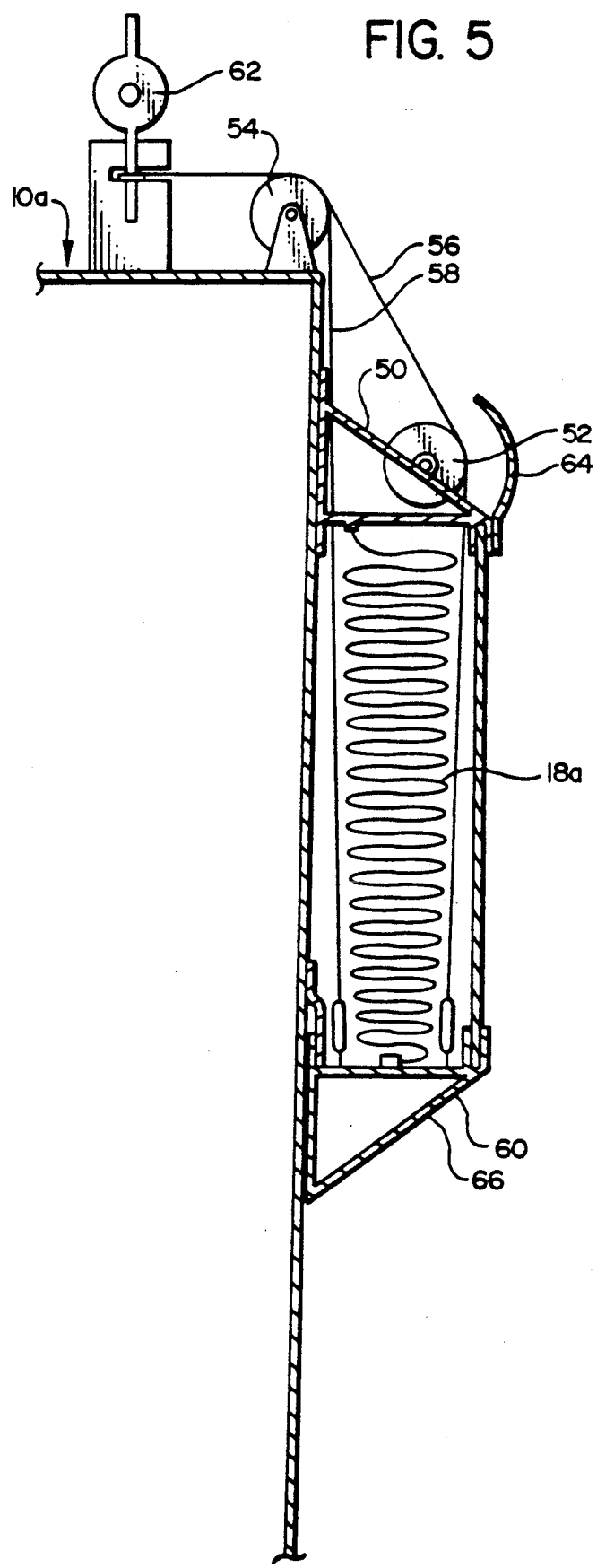

OIL SPILL RECOVERY APPARATUS AND METHOD

BACKGROUND OF THE INVENTION

1. Field of the Invention

The present invention relates to an apparatus for containment of a hazardous liquid substance such as an oil spill from a tanker or the like, and also for recovery of the spilled oil, more particularly to such a device which can be deployed from the tanker or the like itself, so as to contain the oil in an area adjacent to the tanker, and also to a method to accomplish the same.

2. Background Art

There exists in the prior art oil containment booms which are arranged to be deployed in the water at the location of an oil spill so that the spill can be contained and then collected in a suitable manner.

One of the problems with such systems is that such containment booms are sometimes not readily available at the location of the spill, and the spill can spread over a large area before the containment and collecting process can be accomplished.

The present invention is arranged to address these problems.

SUMMARY OF THE INVENTION

The apparatus of the present invention is adapted to contain a spill of a hazardous liquid substance from a vessel located in a body of water, where the vessel has an upper perimeter. The apparatus comprise a containment skirt means having a stowed position where the skirt means is positioned at an upper perimeter location of the vessel in a nonextended position. The skirt means also has a deployed position where it extends downwardly from the vessel perimeter to substantially enclose the vessel, with the skirt means having a lower edge portion which extends from the vessel beneath a surface of surrounding water, so as to provide a containment area between the skirt means and the vessel.

The apparatus further comprises deploying means to enable to the skirt means in the stowed position to be moved from the stowed position downwardly to the containment position. Thus, the skirt means can be maintained in its stowed position for normal operation, and it can be moved to the containment position when a substance spill occurs.

More specifically, the skirt means has an upper edge which in the preferred embodiment is connected to the upper perimeter of the vessel and forms a substantially airtight connection, so that a contained area is provided above said water surface and between an upper portion of said skirt means and the vessel to contain fumes from the contained substance.

In one preferred embodiment, the skirt means is in its stowed position positioned on an upper perimeter deck portion of the vessel. In another preferred embodiment, the skirt means is retained at an upper perimeter location along a sidewall of the vessel.

Also, in the second embodiment, there is a retaining frame means positioned below the skirt means in its stowed position, and the deploying means comprises cable means extending from the vessel to engage the frame means. The cable means is releaseable to cause the lower retaining frame means to descend to permit the skirt means to move to its containment position.

Also, in the preferred form, the skirt means in its containment position is arranged to be capable of being spaced laterally and outwardly from a side portion of the vessel so as to define a containment area where the liquid substance can flow from said vessel into said containment area.

In the method of the present invention, the skirt means is deployed in the manner disclosed above.

Also, the skirt means in the preferred form provides a port means through which the liquid substance is able to be removed, while maintaining an airtight character of the skirt means. Other feature will become apparent from the following detailed description.

DESCRIPTION OF THE DRAWINGS

FIG. 5 is a sectional view taken transversely to a perimeter location of the tanker, showing a second embodiment of the present invention with the apparatus being in its stowed position, ready for deployment.

DESCRIPTION OF THE PREFERRED EMBODIMENTS

In the following description, the present invention will be described as being used in connection with an oil tanker (i.e. a seagoing vessel which is designed to transport oil), but it is to be understood that the present invention can be applied to situations where the medium to be contained and collected is not "oil" necessarily, but any such substance which creates a hazard when it is improperly spilled or otherwise ejected from the vessel. Also, within the broader scope of the present invention, it could be applied to situations where similar containment and collection problems exist where the containing vessel is not necessarily a "tanker" in the conventional sense.

Figure 1:
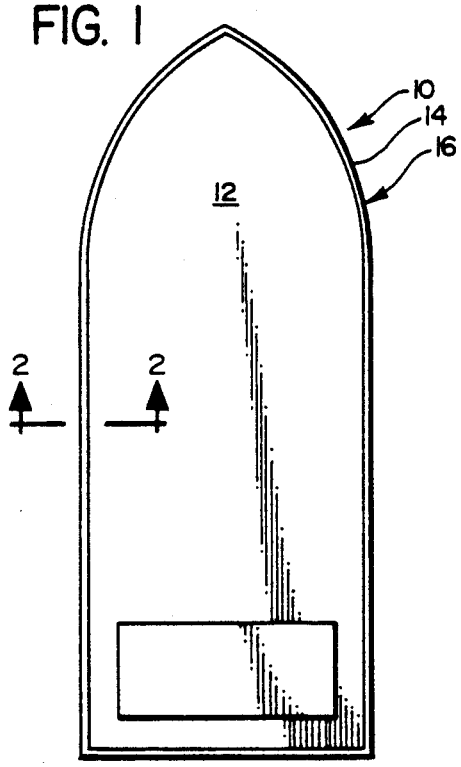
FIG. 1 is a top plan view of an oil tanker, shown somewhat schematically, incorporating the present invention.

FIG. 1 shows a top plan view of an oil tanker 10 having a deck 12 with a perimeter 14. The present invention is generally designated 16, and a first embodiment is illustrated in FIG. 1 through 4.

Figure 2:
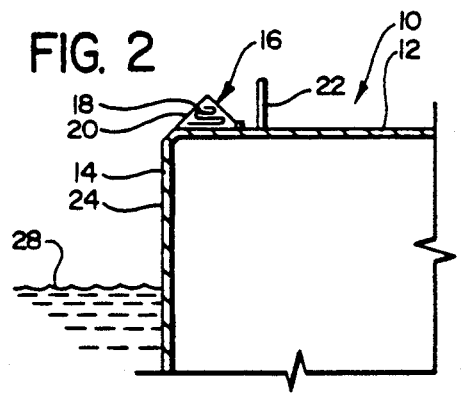
FIG. 2 is a sectional view taken along line 2—2 of FIG. 1, showing a preferred embodiment of the present invention in its stowed position along the perimeter of the deck of the tanker.

As can be seen in FIG. 2, the present invention 16 comprises a skirt 18 which is folded over on itself in layers in a stowed configuration, positioned on the perimeter portion of the deck 14. A suitable cover plate 20 is positioned over the stowed skirt 18. A guard rail 22 is also positioned around the perimeter, inside of the present invention 16.

Figure 3:
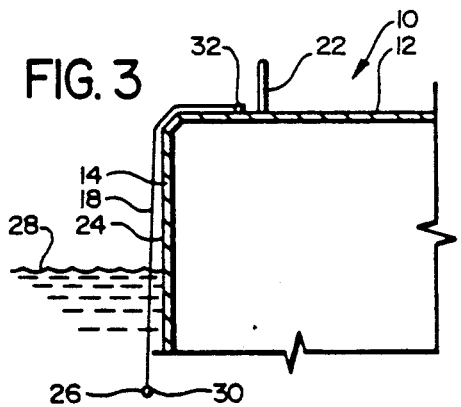
FIG. 3 is a view similar to FIG. 2, showing the present invention in its deployed position to contain an oil spill.

The deployed position of the present invention is illustrated in FIG. 3, and it can be seen that the cover 20 is removed, and the skirt 18 is moved over the edge of the tanker 10 so that the skirt 18 drops downwardly along the side 24 of the vessel, with the lower end edge portion 26 of the skirt being deployed below the surface 28 of the water. (See FIG. 4) The lower edge 26 is weighted, as at 30, to ensure that the skirt 18 extends into the water a sufficient depth to perform its containment function. The upper edge 32 of the skirt remains connected to the tanker deck 12 by suitable connecting means.

Figure 4:
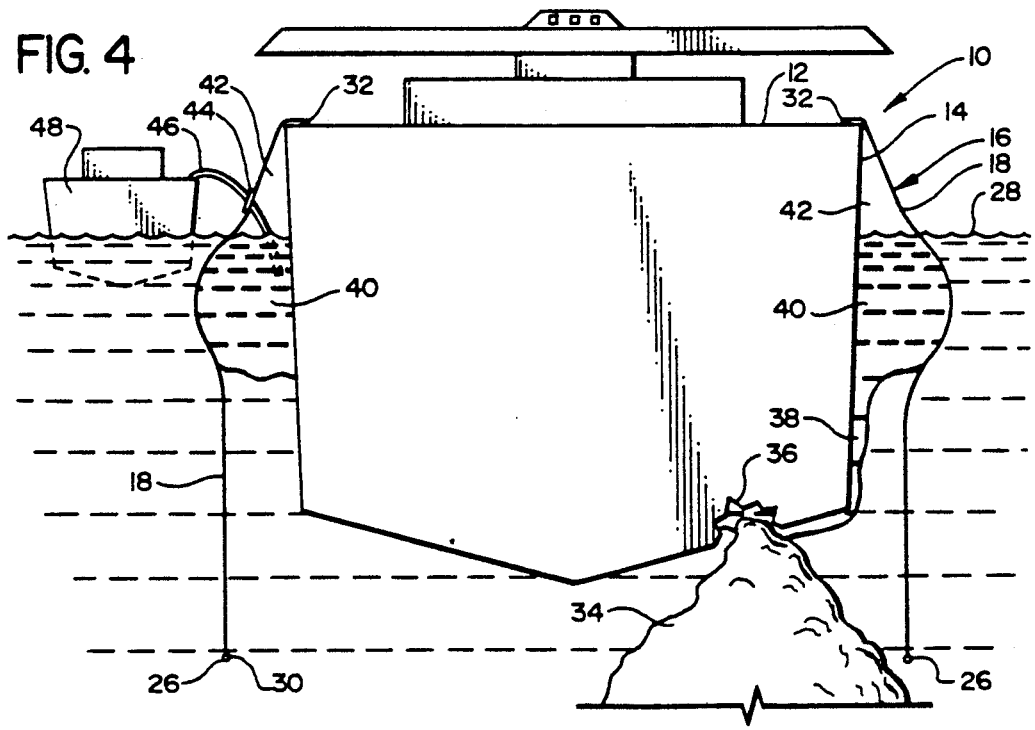
FIG. 4 is a sectional view taken transversely to the lengthwise axis of the tanker at a mid location, showing the manner in which the apparatus is deployed to contain the oil and also to pump the oil to a second vessel designed to receive such spilled oil so that it could be disposed of properly.

To describe further the present invention, reference is made to FIG. 4 which illustrates the present invention in an operating position actually containing an oil spill. It can be seen that the hull of the tanker 10 has come in contact with a rock 34 which has made as hole 36 in the bottom of the tanker 10, with oil from the tanker flowing outwardly through the hole 36 and upwardly, as at 38 along the sidewall of the tanker 10. The skirt 18 is a continuous skirt which extends totally around the tanker 10, and it can be seen in FIG. 4 that the lower edge 26 of the skirt 18 extends a sufficient distance below the bottom of the tanker 10 to provide proper containment.

The skirt 18 is made of a material which prevents the flow of oil or the like therethrough. Further, it should be understood that the skirt 18 is arranged so that in its deployed position of FIGS. 3 and 4, the skirt 18 is permitted to expand outwardly away from the sides of the tanker 10. This can be accomplished by initially arranging the skirt 18 so that its total horizontal length is a sufficient amount greater than the perimeter of the tanker hull, and also by selecting the skirt material so that it could stretch moderately, (or a combination of these two features).

It can be seen in FIG. 4 that as the oil flows up along the side of the tanker 10, it will collect in what might be termed a "pocket" illustrated at 40 which extends around the perimeter Of the tanker 10, with the skirt 18 extending further outwardly to provide an adequate collecting area for the oil. The upper edge 32 of the skirt 18 forms an airtight seal with the deck 12 so that fumes from the oil will collect in the area 42 above the surface of the collected oil and within the upper portion of the skirt 18.

When it is desired to remove the collected oil from the containment area, this can be accomplished through an airtight access port 44 formed in an upper portion of the skirt 18. A collection hose 46 extends through the port 44 into the oil pocket 40, and oil can be pumped through this hose 46 into a collecting vessel, such as shown at 48.

FIG. 5 shows a second embodiment of the present invention. Components of the second embodiment which are similar to corresponding embodiments of the first embodiments will be given like numerical designations, with an "a" suffix distinguishing those from the second embodiment.

In the second embodiment of FIG. 5, there is shown the skirt 18a which in its stowed configuration is arranged with a plurality of folds stacked one on top of the other. There is an upper frame member 50 which is fixedly attached to the side of the tanker 10a and extends around the entire perimeter of the tanker 10a. There are a number of guide rollers 52 mounted at spaced locations along the length of the upper frame 50. Also, there are a number of second rollers 54 mounted on the deck 12a of the vessel and also positioned at spaced locations around the perimeter of the tanker 10a. Sets of cables 56 and 58 extend over related rollers 52 and 54, respectively, and these cables 56 and 58 extend downwardly along the sides of the folded skirt 18a to attach to a lower moveable frame member 60 arranged in sections and extending around the perimeter of the vessel 10a. The upper ends of the cables 56 and 58 are attached to suitable release mechanisms, one of which is shown at 62. An upper curved enclosure 64 extends along the perimeter of the vessel 10a and serves as a rub-rail in case there is engagement with a dock or other structure. The lower frame sections 60 have upwardly and outwardly extending slanted walls 66 which are arranged to react properly to wave action of the water.

When it is desired to deploy the skirt 18a, the cables 56 and 58 are released so that the lower frame sections 60 descend, permitting the skirt 18a to drop into the deployed containing position surrounding the tanker 10a. Thereafter the skirt 18a performs substantially the same function as the skirt 16 discussed previously in relation to the first embodiment.

Subsequent to the containment and removal of the oil spill, the skirt 18a could simply be cut away and utilized in some other application. Alternatively, the cables 56 and 58 could be rewound to cause the lower frame section 60 to carry the skirt 18a upwardly toward the perimeter of the deck 12a.

It is to be recognized that various modifications can be made to the present invention without departing from the basic teachings thereof, and that the terms "oil", "oil spill", and "tanker", along with other descriptive terms used herein are utilized to describe the preferred embodiment of the present invention, and that within the broader scope of the present invention, these terms are to be interpreted more broadly to include other apparatus, components and situations where similar problems are encountered, with the further understanding that the present invention is particularly adapted to remedy the serious consequences which can result from an oil tanker encountering an oil spill situation.

What is claimed is:

1. An apparatus adapted to contain a spill of a hazardous liquid substance from a vessel located in a body of water, where the vessel has an upper perimeter, said apparatus comprising:
   a. containment skirt means having a stowed position where said skirt means is positioned at an upper perimeter location of said vessel in a non-extended position, and a deployed containment position where said skirt means extends downwardly from said vessel perimeter to substantially enclose said vessel, with said skirt means having a lower edge portion which extends from the vessel beneath a surface of surrounding water, so as to provide a containment area between said skirt means and said vessel;
   b. deploying means to enable said skirt means in said stowed position, to be moved from the stowed position downwardly to the containment position, in a manner that said skirt means can be maintained in its stowed position for normal operation, and can be moved to the containment position when a substance spill occurs;
   c. said skirt means having an upper edge which is connected to the upper perimeter of the vessel and forms a substantially airtight connection, whereby a contained area is provided above said water surface and between an upper portion of said skirt means and said vessel to contain fumes from the contained substance.

2. The apparatus as recited in claim 1, wherein said skirt means in its stowed position is positioned on an upper perimeter deck portion of said vessel.

3. The apparatus as recited in claim 1, wherein said skirt means is retained at an upper perimeter location along a sidewall of said vessel.

4. The apparatus as recited in claim 3, further comprising a retaining frame means positioned below said skirt means in its stowed position, and said deploying means comprising cable means extending from said vessel to engage said frame means, with said cables means being releasable to cause said lower retaining frame means to descend and permit said skirt means to move to its containment position.

5. The apparatus as recited in claim 1, wherein said skirt means in its containment position is arranged to be capable of being spaced laterally and outwardly from a side portion of said vessel so as to define a containment area where said liquid substance can flow from said vessel into said containment area.

6. The apparatus as recited in claim 1, wherein said skirt means, in its containment position, defines with said vessel a substantially enclosed upper containment area above said water surface, said skirt means further providing port means through which said liquid substance is able to be removed, while maintaining an airtight character of said skirt means.

7. A method to contain a spill of a hazardous liquid substance from a vessel located in a body of water, where the vessel has an upper perimeter, said method comprising:
  a. providing a containment skirt means in a stowed position where said skirt means is positioned at an upper perimeter location of said vessel in a nonextended position;
  b. moving said skirt means from said stowed position to a deployed containment position where said skirt means extends downwardly from said upper perimeter location to substantially enclose said vessel, with said skirt means having a lower edge portion which extends beneath a surface of surrounding water, so as to provide a containment area between said skirt means and said vessel;
  c. collecting said substance in an area within said skirt means, while maintaining an upper portion of said skirt means attached to said vessel at said upper perimeter location and extending downwardly therefrom to define an upper containment area between said upper portion of said skirt and said vessel.

8. The method as recited in claim 7, further comprising connecting said upper portion of said skirt means to the upper perimeter of the vessel to form a substantially airtight connection, to contain fumes from the contained substance.

9. The method as recited in claim 7, further comprising stowing said skirt means in its stowed position on an upper perimeter deck portion of said vessel.

10. The method as recited in claim 7, further comprising retaining said skirt means in its stowed position at an upper perimeter location along a sidewall of said vessel.

11. The method as recited in claim 10, further comprising providing a retaining frame means positioned below said skirt means in its stowed position, providing cable means extending from said vessel to engage said frame means, and releasing said cable means to cause said retaining frame means to descend and permit said skirt means to move to its containment position.

12. The method as recited in claim 7, further comprising positioning said skirt means in its containment position so that the upper portion of the skirt means extends from the upper perimeter location laterally outwardly and downwardly so as to define an expanded containment area where said liquid substance can flow from said vessel into said containment area.

13. The method as recited in claim 7, further comprising positioning said skirt means in its containment position to define with said vessel a substantially enclosed upper containment area above said water surface, said method further comprising providing a port means in said skirt and removing said liquid substance through said port means while maintaining an airtight character of said skirt means.

* * * * *